US008971667B2

(12) United States Patent
Chao et al.

(10) Patent No.: US 8,971,667 B2
(45) Date of Patent: Mar. 3, 2015

(54) DIGITAL IMAGE AUTO-RESIZING

(75) Inventors: Hui Chao, Palo Alto, CA (US); Prasad Gabbur, Tucson, AZ (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2602 days.

(21) Appl. No.: 11/551,733

(22) Filed: Oct. 23, 2006

(65) Prior Publication Data

US 2008/0095470 A1 Apr. 24, 2008

(51) Int. Cl.
*G06K 9/32* (2006.01)
*G06K 9/38* (2006.01)
*G06T 3/00* (2006.01)

(52) U.S. Cl.
CPC ............... *G06K 9/38* (2013.01); *G06T 3/0012* (2013.01)
USPC ......................................................... 382/298

(58) Field of Classification Search
USPC .................................. 382/180, 113
See application file for complete search history.

(56) References Cited

U.S. PATENT DOCUMENTS

| | | | | |
|---|---|---|---|---|
| 4,837,842 | A * | 6/1989 | Holt | 382/204 |
| 5,680,479 | A * | 10/1997 | Wang et al. | 382/176 |
| 5,893,127 | A * | 4/1999 | Tyan et al. | 715/209 |
| 6,065,021 | A * | 5/2000 | George | 715/245 |
| 6,222,613 | B1 | 4/2001 | Haraguchi et al. | |
| 6,449,398 | B1 | 9/2002 | Gennetten | |
| 6,456,305 | B1 | 9/2002 | Qureshi et al. | |
| 6,826,727 | B1 * | 11/2004 | Mohr et al. | 715/235 |
| 6,912,311 | B2 | 6/2005 | Anderson et al. | |
| 2002/0145618 | A1 * | 10/2002 | Okuno et al. | 345/660 |
| 2002/0175928 | A1 * | 11/2002 | Kanbayashi | 345/700 |
| 2003/0206316 | A1 * | 11/2003 | Anderson et al. | 358/1.18 |
| 2005/0094206 | A1 * | 5/2005 | Tonisson | 358/1.18 |

OTHER PUBLICATIONS

Scalable Vector Graphics (SVG) 1.1 Specification W3C Recommendation Jan. 14, 2003.*
Jaume Rigau et al, Scene Visibility Complexity in Flatland, Research Report IIiA-00-03-RR, Institut d'Informatica, Citeseer 2000.*
John Zukowski, Java AWT Reference, O'Reilly 1997.*

* cited by examiner

*Primary Examiner* — Chan Park
*Assistant Examiner* — Mark Roz
(74) *Attorney, Agent, or Firm* — Gonzales Patent Services

(57) ABSTRACT

A method for auto-resizing an original digital image from an original image to a resized image. The method comprises separating the foreground elements from the background elements, determining an original aspect ratio of the foreground elements and creating resized foreground elements by scaling the foreground elements while maintaining the original aspect ratio. The method further comprises creating resized background elements by stretching or shrinking the background elements to fit the dimensions of the resized image and repositioning the resized foreground and background elements on the resized image while maintaining the design intention of the original image.

20 Claims, 9 Drawing Sheets

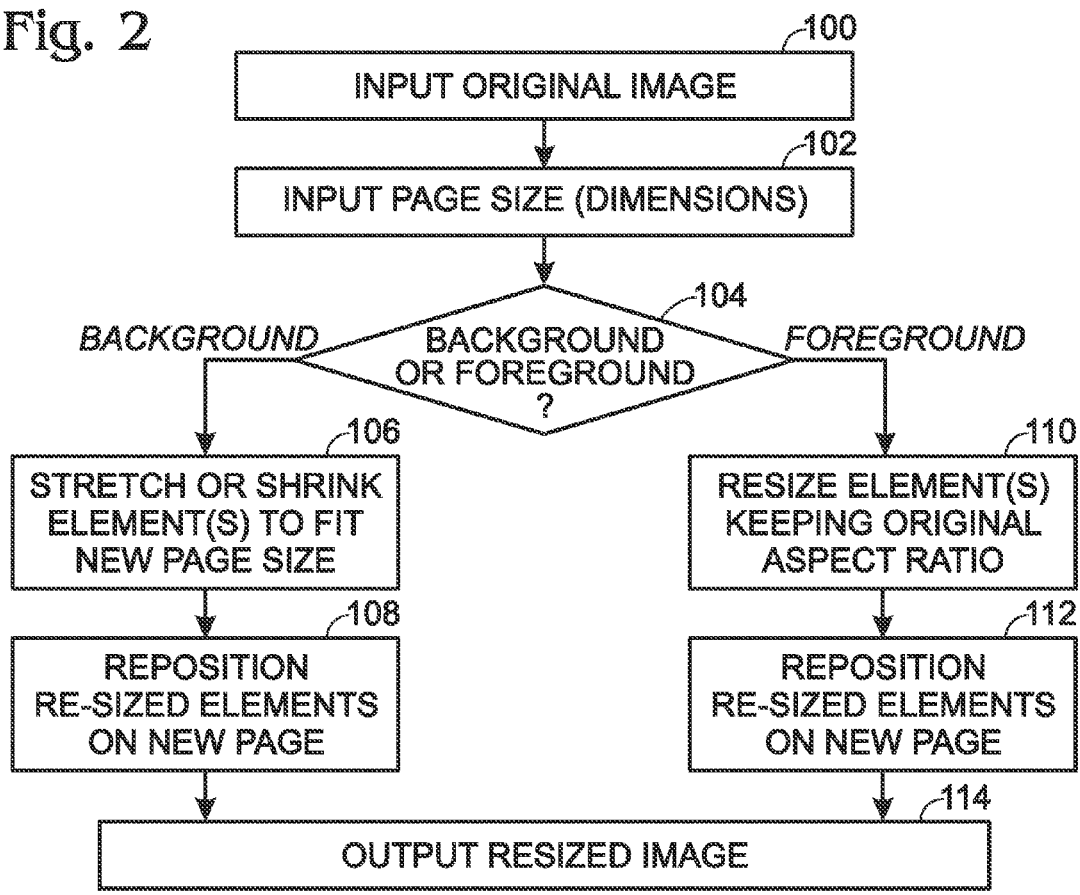
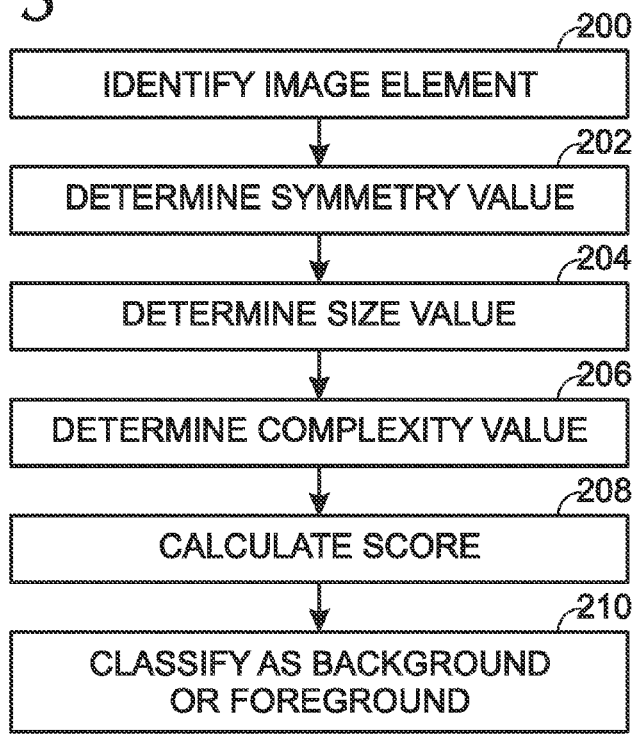

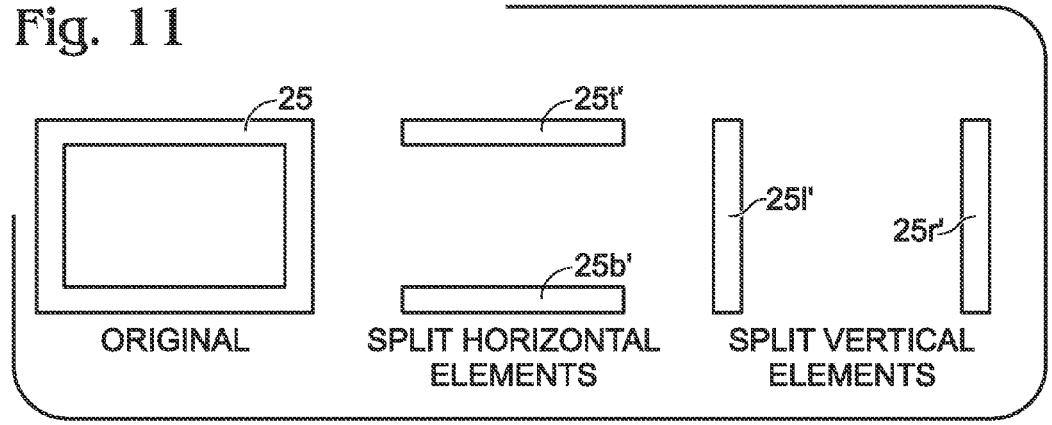
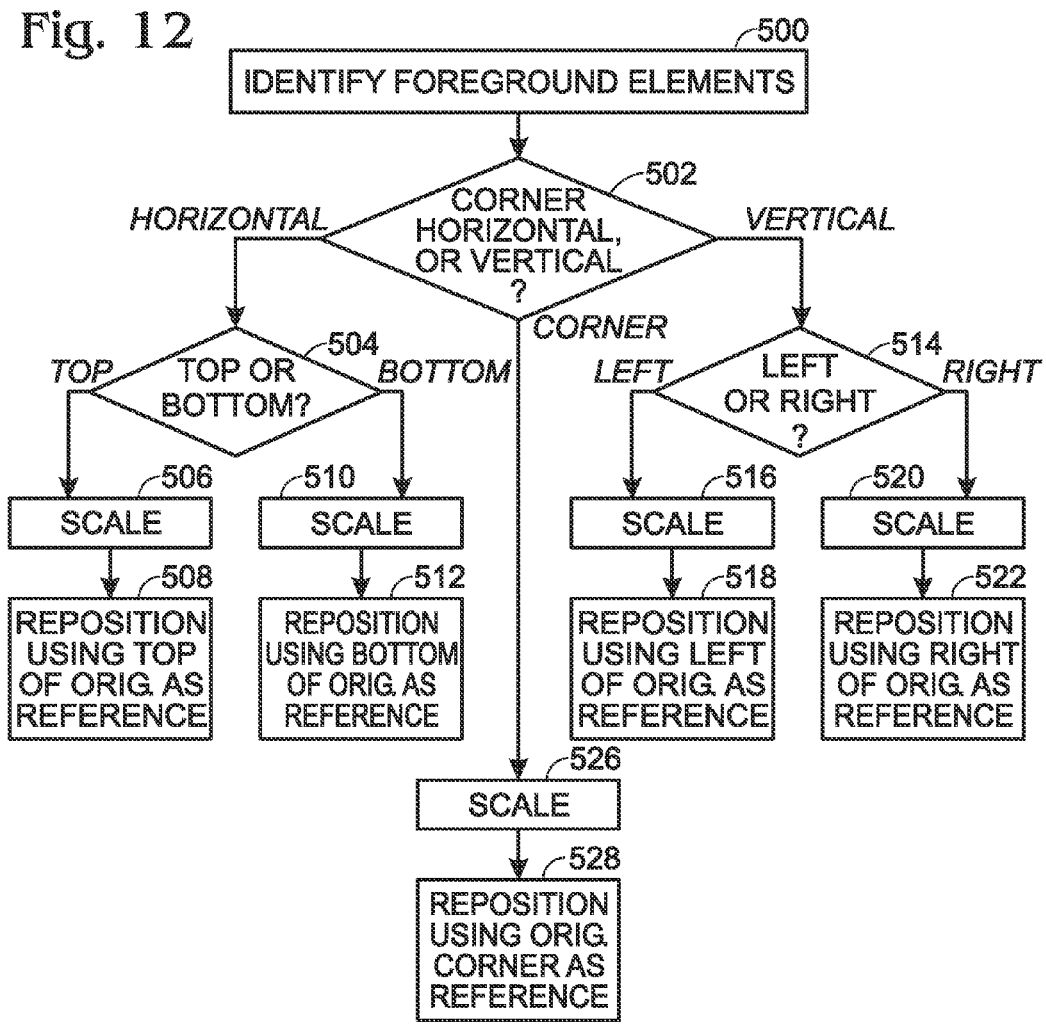

DIGITAL IMAGE AUTO-RESIZING

BACKGROUND

As digital hardware is more readily available, people are personalizing documents in a wide variety of ways. Frequently, documents include images that are designed to be scaled to specific page sizes. For example, people frequently like to incorporate professionally designed borders in their photos, newsletters, postcards, greeting cards and the like. As these images become more and more complex, they frequently incorporate elements that are designed for a specific page size. However, given the multitude of graphic design programs that allow people to resize their documents to any desired size, it would be extremely difficult, if not impossible for a graphic designer to create different versions of the same design for each possible page size.

Typically, current automatic image resizing programs simply scale an original image to fit a new page size without regard to the original design intent of the original image. For example, FIG. 1 depicts an original image 10 that has been resized from an original 4×5 template size to a 4×10 template size (at 12). As shown, the ducks that are used as upper border elements 31 have been stretched to fit the width of the image size, distorting the original proportions and overall look of the ducks. Moreover, depending upon the method used to stretch the image, the relative proportions of the side edge elements to the top and bottom edge elements may be altered, so that instead of having an image with the same size border all around the edge, the side edge may be thicker or thinner than the top or bottom edges (compare, e.g. $w_1$ with $w_2$). Furthermore, some of the image resizing programs simply crop the portions of the images that do not fit onto the new page size, after enlarging the original image, if necessary. Such cropping could clearly damage the design intent of an image including components such as that shown in FIG. 1.

Accordingly, methods and systems for automatically resizing an image while maintaining the original design intent of the image are needed.

BRIEF DESCRIPTION OF THE DRAWINGS

FIG. 2 is a flowchart depicting a method for automatically resizing a digital image according to an embodiment of the present disclosure.

FIG. 3 is a flowchart depicting a method for determining whether an image element is a background or foreground element according to an embodiment of the present disclosure.

FIG. 11 depicts another method for splitting an area element according to another embodiment of the present disclosure.

FIG. 12 is a flowchart depicting a method for re-sizing and repositioning a foreground element according to one embodiment of the present disclosure.

DETAILED DESCRIPTION

Figure 1:
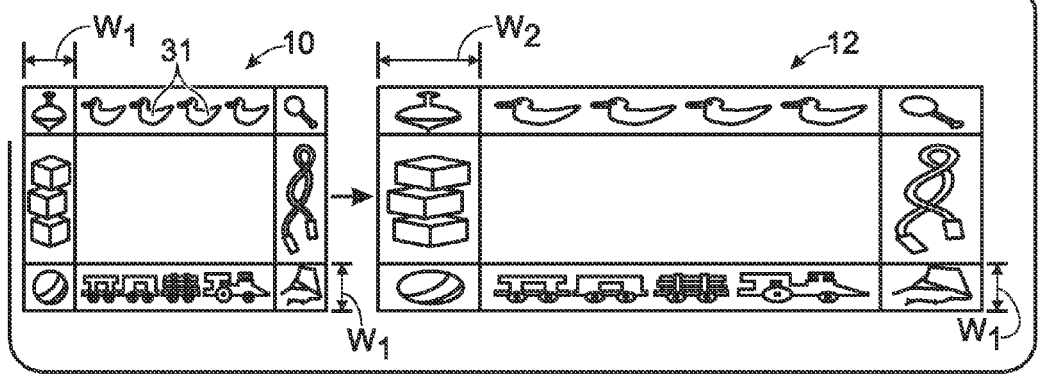
FIG. 1 illustrates a prior art method for automatically resizing a digital image.

The present disclosure provides methods and systems for automatically resizing an image while maintaining the original design intent of the original image.

FIG. 2 provides a flowchart depicting a basic method for automatically resizing a digital image according to an embodiment of the present invention. At block 100 an original image is received. The original image may be, for example, a digital image designed to be a border for a photograph, postcard, newsletter, or the like, or may be any other digital image. The image may be in any suitable format including, for example, vector format, such as a .pdf, .svg., vml. etc., or bitmap format such as .png, tiff, .psd, etc. The image may be provided from any suitable data source including, for example, a folder on a computer or other hardware device, a digital device memory card, an on-line website, or other similar data source.

At block 102, a request to resize the original image to a new image size is received from the user. The new image size may be selected by the user from a list of options or may be input in free form by the user. The new image size may be bigger or smaller than the original image in one or more directions. Accordingly, the new image may or may not retain the aspect ratio of the original image. The request may be received as a direct command to resize the original image from the user, or may be received indirectly, for example, by the user requesting that the original image be printed at a different size, by the user resizing a window on the screen, by the user cropping a photograph or other image that will be inserted into or otherwise associated with the original image, by the detection of a different size of paper in a printer, or by any other indication that the user wishes to resize the original image.

At block 104, foreground elements are separated from background elements. Any suitable method for distinguishing foreground and background elements may be used. For example, some images are designed in various layers wherein each layer is labeled as either foreground or background. Alternatively, an image may be made up of several elements which may be retrieved from one or more sources (clip art files, web-sites, etc.) and each element may include metadata indicating whether the element is a background or foreground element. As a further alternative, elements can be determined to be either foreground or background elements based on their position and other characteristics within the context of the original image. One implementation of a method for distinguishing between background and foreground elements is described below with reference to FIG. 3.

Typically, the image will include at least one of a background element or a foreground element. More typically, the image will include at least one background element or at least one foreground element. For ease of discussion, an image may be referred to as comprising multiple layers such as one or more background layers and one or more foreground layers. Moreover, one or more background elements may be referred to as making up a background layer and one or more foreground elements may be referred to as making up a foreground layer. However, it should be appreciated that such characterization is not intended to limit the disclosure to only those images which are provided in a multilayered format or to only those images having multiple layers wherein the designer of the image has divided and/or identified various image elements as "background layer elements" or "foreground layer elements."

Figure 4:
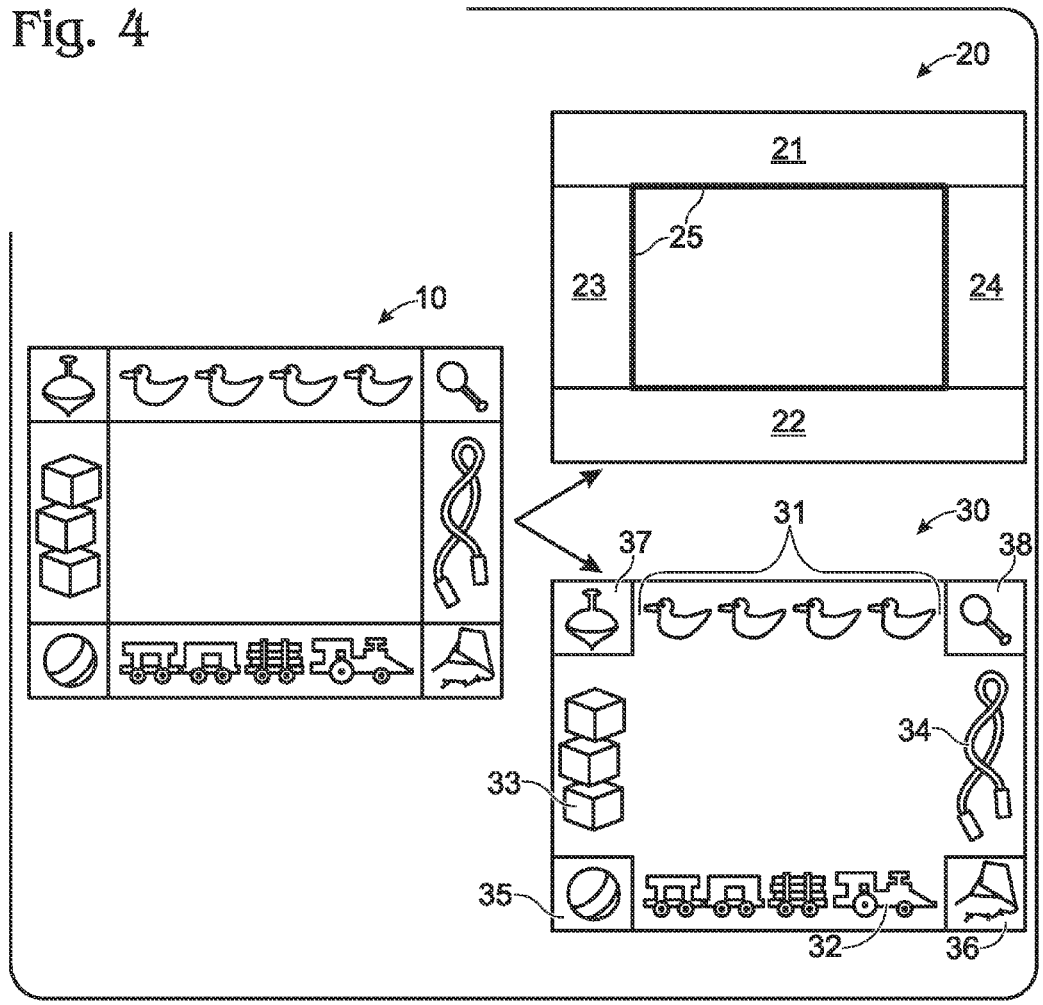
FIG. 4 depicts the various layers which may make up a digital image according to an embodiment of the present disclosure.

FIG. 4 shows original image 10 broken down into constituent layers, background layer 20 and foreground layer 30. As shown, original image 10 includes multiple elements which can be divided into background layer elements 21-25 and foreground layer elements 31-38.

Returning to FIG. 2, if an element is determined to be a background element, the method proceeds to block 106, where the background element is re-sized, by stretching or shrinking, as necessary, to fit the new page size. It should be noted that, according to one embodiment, the re-sizing of the background element is performed without regard to the original aspect ratio of the element. One implementation of a method for resizing background elements is described below with reference to FIGS. 5-11.

Still referring to FIG. 2, at block 108, the resized background element is repositioned on the new page in order to maintain the design intent of the original image. For the purposes of the present disclosure the phrase "in order to maintain the design intent of the original image" is intended to mean that the resized image maintains the look, feel, and relative proportions of the original image while still fitting to the new page size. In other words, the re-sized image should look as if the depicted image was designed for the current page size. One implementation for repositioning background elements is described below with references to FIGS. 5-11.

Returning to block 104, if an element is determined to be a foreground element, the method proceeds to block 110, where the element is re-sized to fit the new page size, while maintaining the original aspect ratio of the element.

At block 112, the resized foreground element is repositioned on the new page in order to maintain the design intent of the original image. One implementation for resizing and repositioning foreground elements is described below with references to FIGS. 12-17.

Still referring to FIG. 2, after all the background and foreground elements in the image have been resized and repositioned to create the new re-sized image, the re-sized image is output to the user at block 114. The image may be output by displaying the image on or as part of: a display screen such as a computer monitor, camera screen, printer screen, printed page, projected image, or the like.

Turning now to FIG. 3, a method for distinguishing between background and foreground elements is shown. Briefly, each element undergoes a variety of measurements which evaluate and identify the position and features of the element with respect to the original image. Accordingly the "page" referred to with respect to the steps of FIG. 3, is the page for which the original image was designed.

At block 200, an image element is identified. At block 202, a symmetry value for the image element is determined. According to one embodiment, the symmetry value may be determined as follows:

$$HSymmetry = fabs(pHCenter - hCenter)/pWidth;$$

$$VSymmetry = fabs(pVCenter - vCenter)/pHeight;$$

$$symmetry = (1 - min(HSymmetry, VSymmetry)) * 100;$$

Where:
pHCenter is the page horizontal center;
pVCenter is the page vertical center;
hCenter is the horizontal center of the image element; and
vCenter is the vertical center of the image element.

Accordingly, the symmetry value for an image may range from >0 to 100. If the image element is placed in the horizontal or vertical center of the page, the symmetry value for the image will be 100.

At block 204, a size value for the image element is determined. According to one embodiment, the size value may be determined as follows:

$$widthRatio = fabs(pWidth - width)/pWidth;$$

$$heightRatio = fabs(pHeight - height)/pHeight;$$

$$size = (1 - min(widthRatio, heightRatio)) * 100;$$

Where:
pWidth is the page width;
pHeight is the page height;
width is the image element width;
height is the image element height Accordingly, the size value may range from >0 to 100. If one size of the bounding box of the image element is the same as one side of the page, the size value will be 100.

At block 206, a complexity value for the image element is determined. According to one embodiment, the complexity value may be determined as follows:

```
If(type=="Drawing")
{
    xCmplex=fabs(pCenter.x-HBoxCenter)/pWidth*100;
    yCmplex=fabs(pCenter.y-VBoxCenter)/pHeight*100;
    complexityI=min(xCmplex, yCmplex);
    if(complexityI>5)
    {
        int numOfAnchorPoints=getAnchorPoints((element);
        complexity2=numOfAnchorPOints;
        complexity=complexity2;
    }
    else
        complexity=complexity1;
}
else
complexity=0;
if complexityI>5
{
    int
numOfAnchorPoints=getAnchorPoints((PDEPath)element);
        complexity2=numOfAnchorPoints;
        complexity=complexity2;
}
else
    complexity=complexityI;
}
```

Where, pcenter.x and pcenter.y are each the center of the 2D bounding polygon of the image element in the horizontal and vertical direction, respectively. HBoxCenter and VBox- Center are each the center of the bounding box of the image element in horizontal and vertical direction, respectively. "Complexity1" is a complexity measure of the element, based on the symmetry of the element. "numOfAnchorPoints" is the number of anchor points in the drawing element.

Drawing elements are composed by lines, curves and rectangles with fill and stroke. A line has two anchor points—the start and the end points. One type of curve that is frequently used in computer graphics is a Bezier curve. A Bezier curve has 4 anchor points, the start point, the end point and two control points. A rectangle also has 4 anchor points, one for each corner of the rectangle. Accordingly, "complexity2" uses the number of anchor points along the drawing path to decide the complexity of the shape.

Accordingly, the complexity value may range from 0 to 100. For non-drawing elements, such as text, the complexity measure is set to be 100. For drawing elements, the complexity measure is based on the symmetry of the bounding polygon of the element and the number of anchor points in the drawing path. If the element is symmetrical, that is if the horizontal or vertical center of the bounding polygon is also the horizontal or vertical center of the bounding box, then the complexity is 0. Otherwise, the number of anchor points is included in the calculation.

Once the symmetry, size, and complexity values are determined for a given element, a score is calculated at 208 and the element is classified as either a background or foreground element at 210. In general, background elements tend to be symmetrically placed on the page (i.e. have a high symmetry value), their size is closer to the dimension of the page (i.e. they have a high size value) and they tend to be simpler (i.e. they have a low complexity value.)

Figure 5:
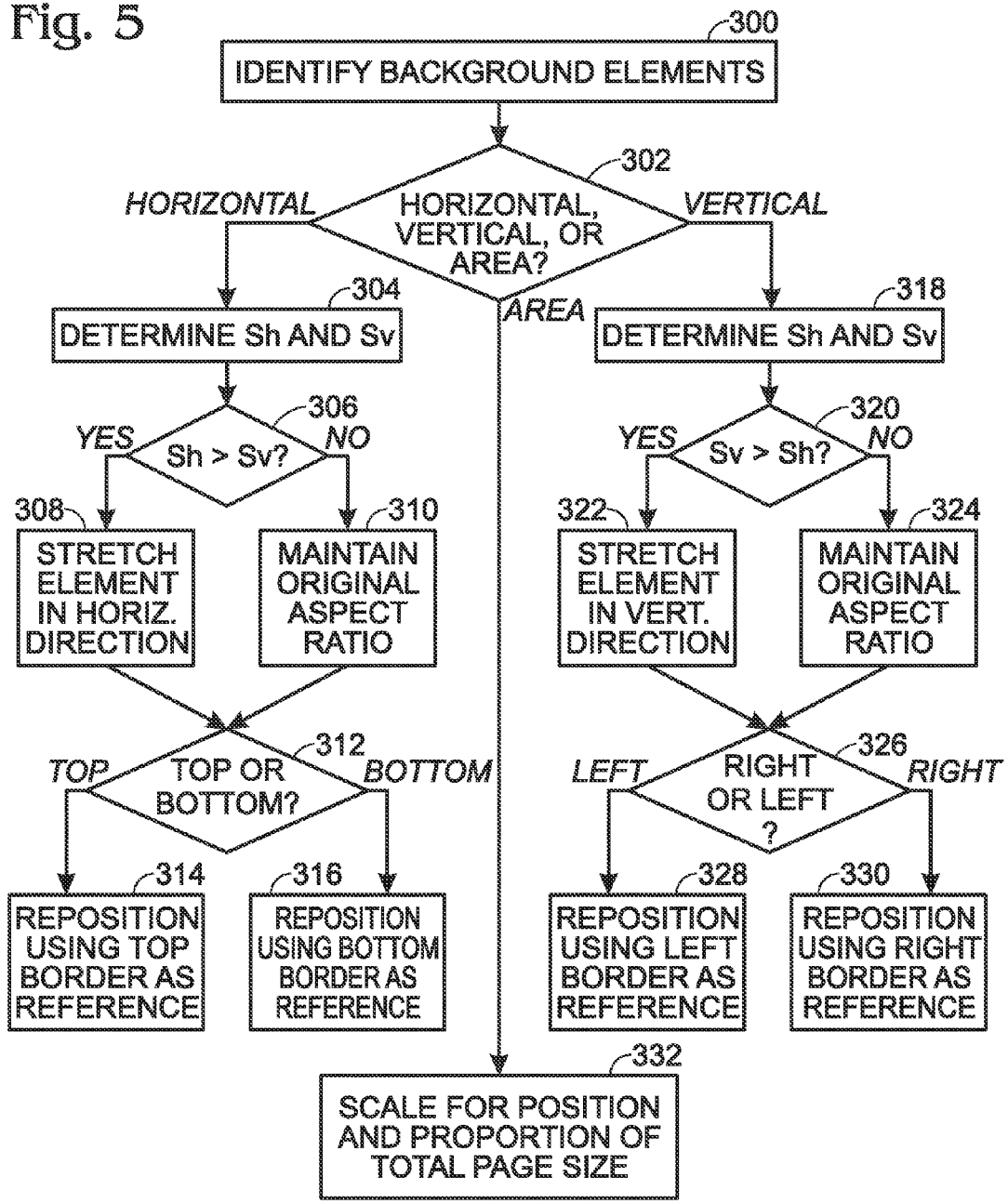
FIG. 5 is a flowchart depicting a method for re-sizing and repositioning a background element according to one embodiment of the present disclosure.

Turning now to FIG. 5, a method for resizing and repositioning background elements is shown. At block 300, background elements are identified, such as by using one or more of the methods described above. If necessary, individual background elements may be extracted, for example, from a background layer. For example, background elements may be extracted by binarizing the alpha channel or luminance of a background layer to create a binary image. Connected components in the binary image can then be identified.

At block 302, each background element is classified as either a horizontal, vertical, or area element. Each element is then scaled based on its classification.

Figure 6:
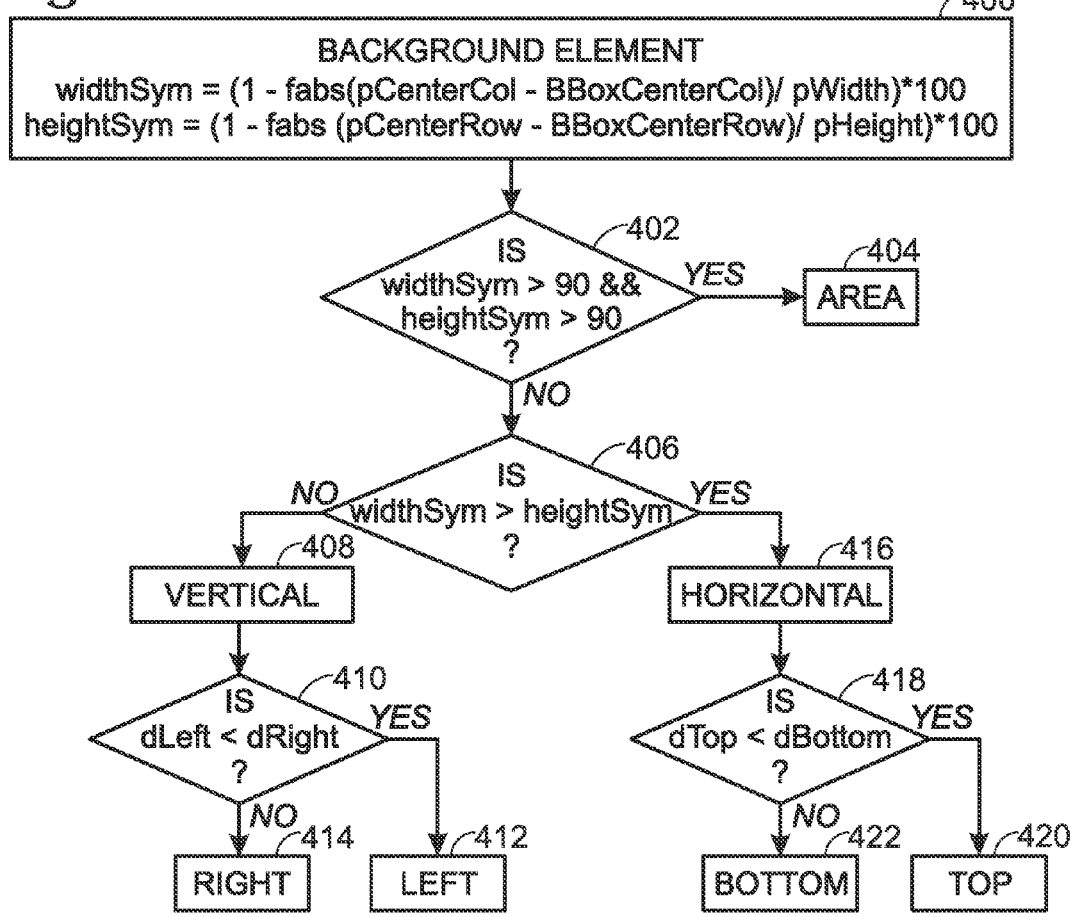
FIG. 6 is a flowchart depicting a method for sub-categorizing background elements according to an embodiment of the present disclosure.

Turning briefly to FIG. 6, one implementation for classifying background elements is described. Generally, the method classifies and sub-classifies each element based on its relative position and proximity to the various borders on the original page.

According to the depicted embodiment, an element is classified as an area element if the bounding box of the element lies within a predefined area around the center of the image. At 400, widthsym and heightsym are calculated. As calculated, widthsym reflects the symmetry of an element in the horizontal direction. Correspondingly, heighsym reflects the symmetry of an element in the vertical direction.

At 402, the method determines if widthSym>90 and if heightsym>90. If both of these are true, the element is classified as an area element at 404. An example of an area element is shown at 25 in FIG. 4.

An element is classified as a vertical element if the element is more symmetrically placed in the vertical direction than the horizontal direction. Accordingly, at 406 if widthsym is not greater then heightsym the element is classified as a vertical element (408). The method than proceeds to block 410 to determine if the element is a left or right vertical element by determining the distance from the left edge of the element to the left border of the original page (dLeft) and the distance from the right edge of the element to the right border of the original page (dRight). If dLeft is less than dRight, the element is classified as a left vertical element (412). An example of a left vertical background element is shown at 23 in FIG. 4. If dLeft is not less than dRight, the element is classified as a right vertical element (414). An example of a right vertical background element is shown at 24 is FIG. 4.

Returning to block 406, an element is classified as a horizontal element if the element is more symmetrically placed in the horizontal direction than the vertical direction. Accordingly, if widthsym is greater than HeightSym, the element is identified as a horizontal element (416).

The method then proceeds to block 418 to determine if the element is a top or bottom element. Briefly, an element is sub-classified as a top element if it lies closer to the top border than the bottom border. Conversely, the element is sub-classified as a bottom element if it lies closer to the bottom border than the top border. Accordingly, the distance from the top edge of the element to the top border of the original page (dtop) and the distance from the bottom edge of the element to the bottom border of the original page (dBottom) is determined. If dtop is less than dBottom, the element is classified as a top horizontal element. An example of a top horizontal background element is shown at 21 is FIG. 4. If dtop is not less than dBottom, the element is classified as a bottom horizontal element. An example of a bottom horizontal background element is shown at 22 in FIG. 4.

Returning to FIG. 5, if an element is a horizontal element, the method proceeds to block 304, where the horizontal and vertical scaling factors are determined. The horizontal scaling factor (Sh) is the ratio of the width of the new page (i.e. the width of the page on which the re-sized image will appear) to the width of the original page. The vertical scaling factor (Sv) is the ratio of the height of the new page to the height of the original page.

At 306, if Sh is greater than Sv, the element is allowed to stretch (or shrink) in the horizontal direction (308). In this case, the element is scaled by Sh' in horizontal direction and scaled by Sv in vertical direction. Sh'=(Sh−Sv)*origPW/origEW+Sv. Where origPW is the original page width and origEW is the original element's bounding box width. If the bounding box width of the element is the same as the page width of the original page, then Sh'=Sh. Sh' is calculated so that any gaps between element's edge and the re-sized page edge are scaled proportionally in Sv to any gaps in the original image.

For the purposes of the present disclosure, it should be understood that the terms "stretch" and "shrink" are intended to mean the resizing of an element without regard to the original aspect ratio of the image. Accordingly, a "stretched" element may be elongated in only one direction, i.e. may be resized such that it is wider than the original element in the horizontal direction, but the same size as the original in the vertical direction. If Sh is not greater than Sv, the element is not allowed to stretch (or shrink) in the horizontal direction and, if the element is scaled, the original aspect ratio is maintained, i.e., the element is scaled by Sv in both the horizontal and vertical directions(310).

At 312, the element is identified as either a top or bottom element. If the element is a top horizontal element, the element is repositioned and scaled, as necessary, using the top border as a reference (314). If the element is a bottom horizontal element, the element is repositioned and scaled, as necessary, using the bottom border as a reference (316).

Figure 7:
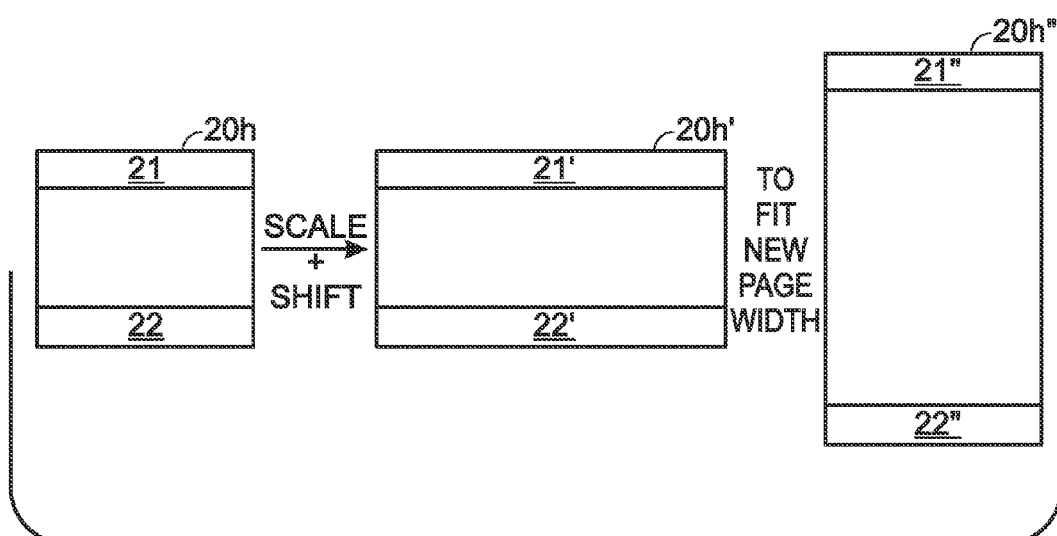
FIG. 7 depicts the scaling of horizontal background elements according to an embodiment of the present disclosure.

Turning to FIG. 7, the scaling of horizontal background elements according to an embodiment of the present disclosure is depicted. As shown, original background layer 20h includes horizontal elements 21 and 22. Element 21 is a top horizontal element and element 22 is a bottom horizontal element.

New page 20h' is wider (i.e. larger in the x-direction) than original page 20h, but has the same height. Accordingly, elements 21' and 22' have been stretched in the x-direction (i.e. in width). Because original elements 21 and 22 extended the entire length of page 20h, re-sized elements 21' and 22' have been stretched to extend along the entire length of page 20h'.

New page 20h" has increased height (i.e. is longer in the y-direction) than original page 20h, but has the same width. Accordingly, elements 21" and 22" have not been stretched. However, elements 21" and 22" have been repositioned to the top and bottom of the new page, respectively.

Returning to block 302 of FIG. 5, if the element is a vertical element, the method proceeds to block 318 to determine the horizontal and vertical scaling factors. At 320, if Sv is greater than Sh, the element is allowed to stretch in the vertical direction (322), The element is scaled by Sh in horizontal direction and Sv' in vertical direction. Sv'=(Sv−Sh)*origPH/origEH+Sh. Where origPH is the original Page height and origEH is the original element's bounding box height. If the bounding box height of the element is the same as the page height in the original page, then Sv'=Sv. Again Sv' is calculated so that any gaps between the element(s) and the page edges are scaled proportionally in Sh to any gaps in the original image. If Sv is not greater than Sh, the element is not allowed to stretch in the vertical direction and, if the element is scaled, the original aspect ratio is maintained, i.e., the element is scale by Sh in both horizontal and vertical direction (324).

At 326, the element is identified as either a left or right element. If the element is a left vertical element, the element is repositioned and scaled, as necessary, using the left border as a reference (328). If the element is a right vertical element, the element is repositioned and scaled, as necessary, using the right border as a reference (330).

Figure 8:
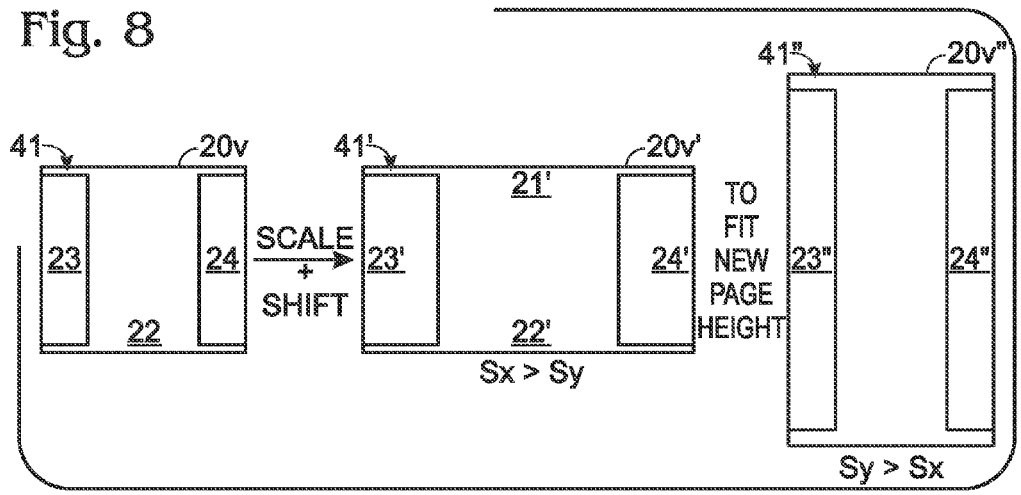
FIG. 8 depicts the scaling of vertical background elements according to an embodiment of the present disclosure.

Turning to FIG. 8, the scaling of vertical background elements according to an embodiment of the present disclosure is depicted. A shown, original background layer 20v includes vertical elements 23 and 24. Element 23 is a left vertical element and element 24 is a right vertical element.

New page 20v' is wider (i.e. longer in the x-direction) than original page 20h, and has increased slightly in height (i.e. is slightly longer in the y-direction), Sh>Sv. Accordingly, elements 23' and 24' have been scaled proportionally by Sv in both the vertical and horizontal directions (324) such that they cover the same relative amount of space on page 20v' as they did on page 20v. Put another way, because element 23 does not extend the entire length of the vertical edge, a gap 41 appears between the edge of page 20v and the top end of element 23. Accordingly, the method of FIG. 5 is configured to stretch element 23' so that gap 41' is the same proportionate size as gap 41. Furthermore, elements 23' and 24' have been repositioned to the same relative space on page 20v' as the placement of elements 23 and 24 on page 20v. In other words, elements 23' and 24' have been repositioned to the left and right edges of page 20v', respectively.

Following the same logic, it can be seen that page 20v" is taller than page 20v, but the same width. Accordingly elements 23" and 24" have been stretched in the vertical direction to take up the same relative space as elements 23 and 24 on page 20v.

Returning to block 302 in FIG. 5, if the element is determined to be an area element, the element is scaled to fit the new page so that it is placed at the same relative position while keeping the gaps between the element borders and corresponding page borders to be in the same proportion as the gaps in the original page. When Sh>Sv, the element's scaling factor in the horizontal and vertical directions are Sh' and Sv, respectively. When Sh<Sv, the element scaling in horizontal and vertical direction are Sh and Sv' respectively.

Figure 9:
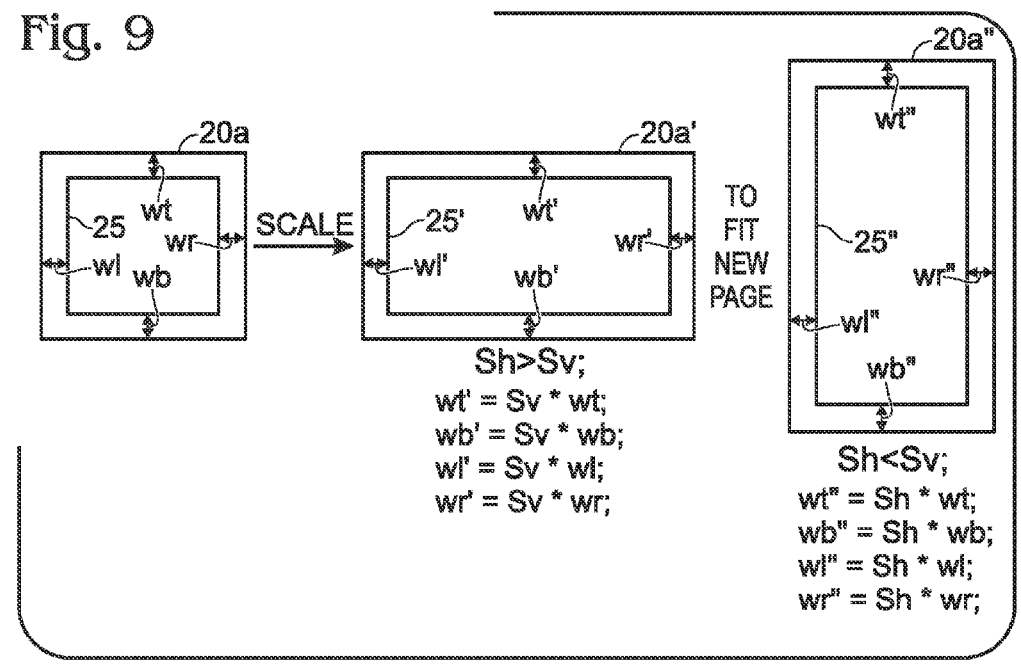
FIG. 9 depicts the scaling of area background elements according to an embodiment of the present disclosure.

Turning to FIG. 9, the scaling of an area image is shown. Page 20a includes a single area element 25, which is centered within page 20a. New page 20a' is wider than page 20a, but the same height. Accordingly, area element 25' has been scaled to be wider than element 25, but is also centered within page 20a'.

Similarly, page 20a" is taller than page 20a, but the same width. Accordingly area element 25" has been scaled to be taller than element 25, but, again, is centered within page 20a".

Alternatively, the individual elements of an area element could be split up and categorized as horizontal and vertical elements and then scaled and repositioned according to the methods described above. For example, rectangular area element 25 could be treated as two vertical elements (one left and one right) and two horizontal elements (one top and one bottom) and scaled and repositioned as such. According to some embodiments, this may lead to a more uniform scaling in the horizontal and vertical direction.

Figure 10:
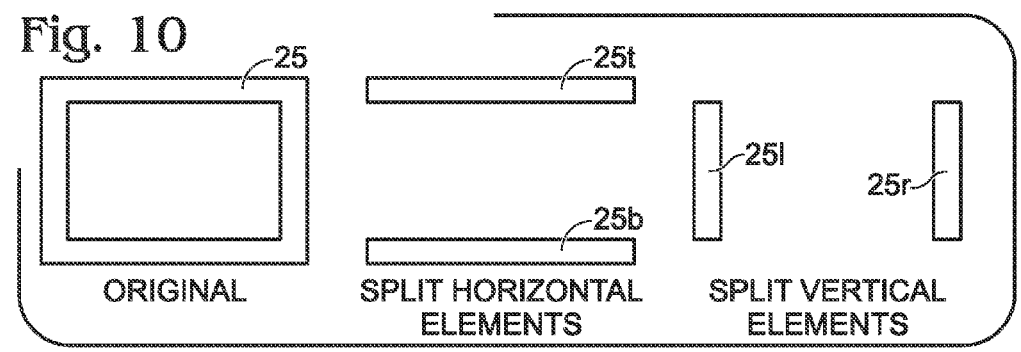
FIG. 10 depicts a method for splitting an area element according to an embodiment of the present disclosure.

One method for splitting an area element is shown in FIG. 10. In the depicted method, two horizontal cuts split the area element into two horizontal elements 25t and 25b and two vertical elements 25l and 25r. A second method is depicted in FIG. 11. In this method, two vertical cuts split the area element into two horizontal elements 25t' and 25b' and two vertical elements 25l' and 25r'. The horizontal cut method of FIG. 10 may be selected, for example, when the horizontal scaling factor is greater than the vertical scaling factor. This is an effective method in this case because the split horizontal elements cover the entire breadth of the page in both the original and the resized image and the vertical split elements get scaled symmetrically, preserving the aspect ratio. Similarly, a vertical cut when the scaled image has a vertical stretch may be preferred according to some embodiments.

The splitting of elements may be accomplished by projecting the element pixel count in the background layer along the horizontal and vertical directions. The projected signals are differentiated and peaks in the differentiated signal are computed. The locations of the two largest peaks in the differentiated projection signal along the vertical direction determine the row coordinates of the inner corners of the hollow element. Similarly, the locations of the two largest peaks in the differentiated projection signal along the horizontal direction determine the column coordinates of the inner corners of the hollow element. Additional checks may be employed to ensure that the largest peaks correspond to the inner corners of the hollow element and not something else. For example, a threshold may be employed that requires that the magnitude of the peaks be at least 20 percent of the element dimension (element width for vertical direction peaks, element height for horizontal direction peaks). Alternatively or additionally, the system may require that the value of the derivative at the left peak be negative and the right peak be positive. Similar checks may be employed for top and bottom peaks.

Turning now to FIG. 12, a method for scaling and repositioning foreground elements according to one embodiment of the present disclosure is provided. At block 500, foreground elements are identified. As with the background elements, individual foreground elements may be extracted, for example, from a foreground layer. For example, foreground elements may be extracted by binarizing the alpha channel or luminance of a foreground layer to create a binary image. Connected components in the binary image can then be identified.

Figure 13:
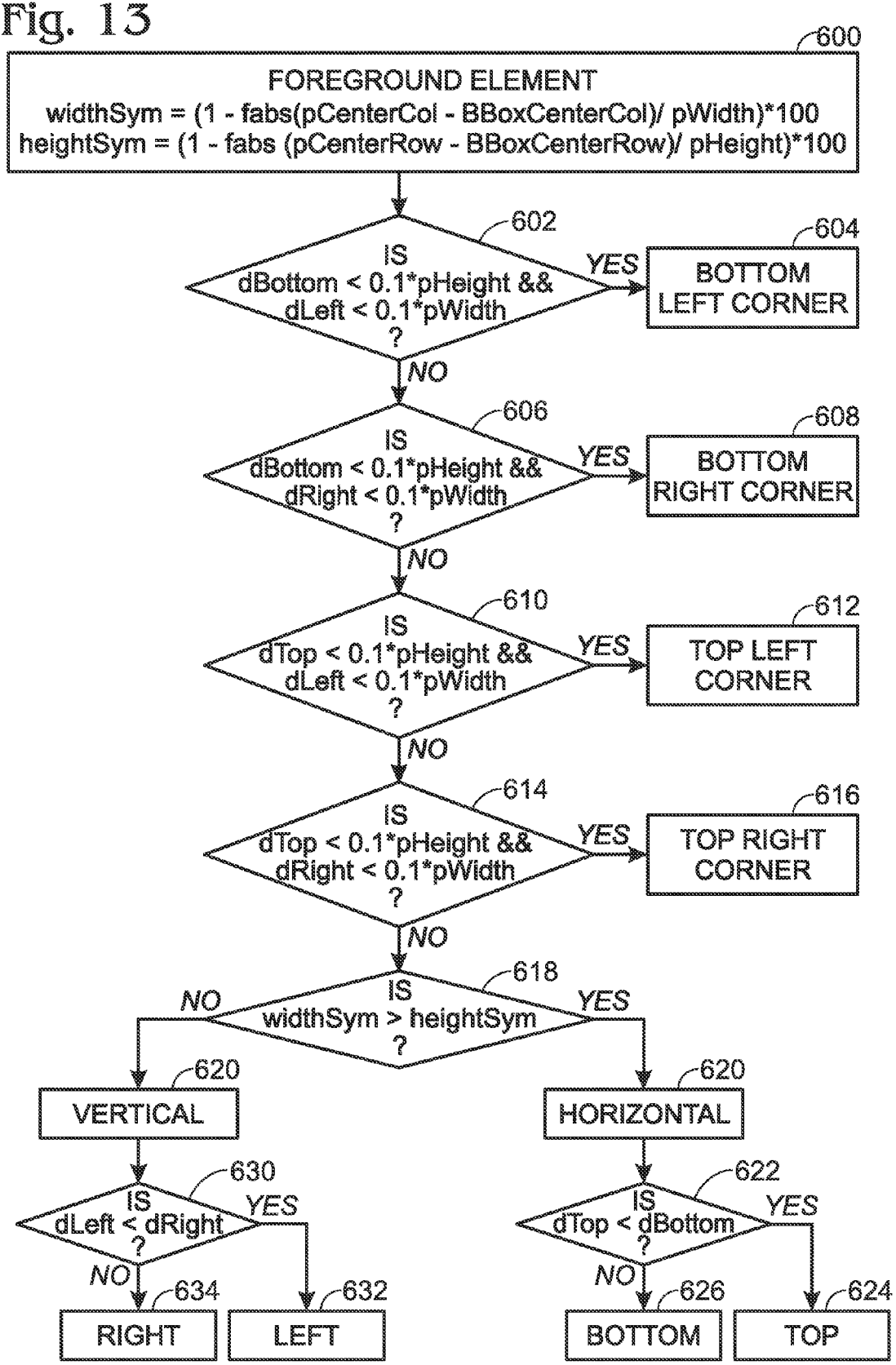
FIG. 13 is a flowchart depicting a method for sub-categorizing foreground elements according to an embodiment of the present disclosure.

At block 502, the foreground elements are categorized as corner, horizontal, and vertical foreground elements. FIG. 13 depicts an implementation of a method for categorizing foreground elements according to an embodiment of the present disclosure. Briefly, the method classifies and sub-classifies each element based on its relative position and proximity to the various borders on the original page.

Turning to FIG. 13, an element is classified as a corner element if any pair of adjacent element borders is close enough to the nearest pair of adjacent image borders. Depending on the pair of borders that satisfy this criterion, the corner element is sub-classified as a bottom-left, bottom-right, top-left, or top-right corner element.

At block 600 widthSym and heightSym are calculated. As stated above, these measurements determine the symmetry of the element in the horizontal and vertical directions, respectively.

At block 602 the method determines whether the bottom and left borders of the element are within a given distance of the bottom left corner of the original image page. If it is, the element is classified as a bottom-left corner element (604). It will be understood that the specific distance requirement may depend upon the specific types of images that are being resized and that the depicted example is being shown as a non-limiting example. An example of a bottom-left corner element is shown at 35 in FIG. 4.

Still referring to FIG. 13, at block 606 the method determines whether the bottom and right borders of the element are within a given distance of the bottom right corner of the original image page. If it is, the element is classified as a bottom-right corner element (608). An example of a bottom-right corner element is shown at 36 in FIG. 4.

Still referring to FIG. 13, at block 610 the method determines whether the top and left borders of the element are within a given distance of the top left corner of the original image page. If it is, the element is classified as a top-left corner element (612). An example of a top-left corner element is shown at 37 in FIG. 4.

Still referring to FIG. 13, at block 614 the method determines whether the top and right borders of the element are within a given distance of the top right corner of the original image page. If it is, the element is classified as a top-right corner element (616). An example of a top-right corner element is shown at 38 in FIG. 4.

Still referring to FIG. 13, at block 618, the method determines if the element is a vertical or horizontal element by determining whether the element is place more symmetrically in the horizontal direction or the vertical direction. This can be calculated by determining if widthSym is greater than heightSym. If it is, the element is classified as a horizontal element (620); if it isn't, the element is classified as a vertical element (628). Examples of horizontal foreground elements are shown at 31 and 32 on FIG. 4. Examples of vertical foreground elements are shown at 33 and 34 of FIG. 4.

Still referring to FIG. 13, if the element is a horizontal element, at block 622, the method further determines if the element is a top or bottom horizontal element by determining if dtop is smaller than dBottom. If it is, the element is sub-classified as a top element, if it isn't, the element is sub-classified as a bottom element. In FIG. 4, element 31 (which is itself made up of a repetitive pattern of individual elements) is a top horizontal element and element 32 is a bottom horizontal element.

Returning to block 630 of FIG. 13, the method further determines if the element is a right or left vertical element by determining if dLeft is less than dRight. If it is, the element is sub-classified as a left vertical element and, if it isn't, the element is sub-classified as a right vertical element. In FIG. 4, element 33 is a left vertical element and element 34 is a right vertical element.

Returning to FIG. 12, if the element is determined to be a horizontal element, the method moves to block 504 to determine if the element is a top or bottom horizontal element, for example, by using the methods described above. The elements are then scaled maintaining the original aspect ratio and repositioned using the top (block 508) or bottom (block 512) of the original image as a reference. According to one embodiment, the aspect ratio of all the elements in the foreground layer is preserved by selecting a uniform scaling factor along both the horizontal and vertical directions. The uniform scaling factor may be, for example, the minimum of the page scaling factors in the horizontal and vertical directions.

Figure 14:
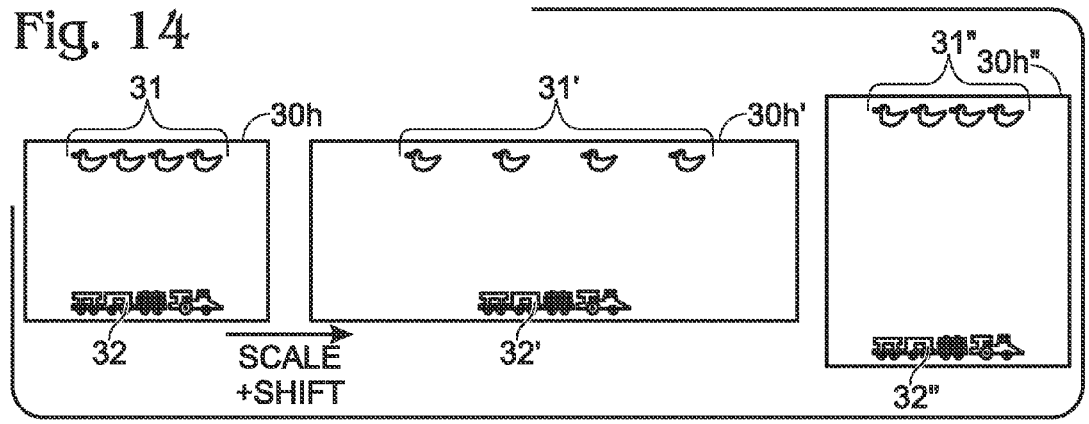
FIG. 14 depicts the scaling of foreground elements according to an embodiment of the present invention.

For example, in FIG. 14, page 30$h'$ is wider than page 30$h$, but the same height. Accordingly, in the depicted embodiment, the uniform scaling factor was selected to be 1, to reflect the scaling factor in the vertical direction. As shown, top horizontal element 31 on page 30$h$ is made up of a plurality of duck images. On page 30$h'$, which is wider than page 30$h$, the ducks are the same size as the ducks on page 30$h$, but have been spread out so that the ducks on page 30$h'$ occupy the same relative space as the ducks on page 30$h$. Conversely, page 30$h''$ is taller than page 30$h$, but the same width. Accordingly, the scaling factor is still 1, which reflects the horizontal scaling factor. Moreover, because the width of page 30$h''$ is the same as that of page 30$h$, the ducks occupy the same position relative to each other that they had on page 30$h$. In this case, the horizontal elements 31" and 32" have simply been moved to the top and bottom edges of page 30$h''$, respectively, while maintaining the same relative spacing between the elements and the edge of page 30$h''$.

Figure 15:
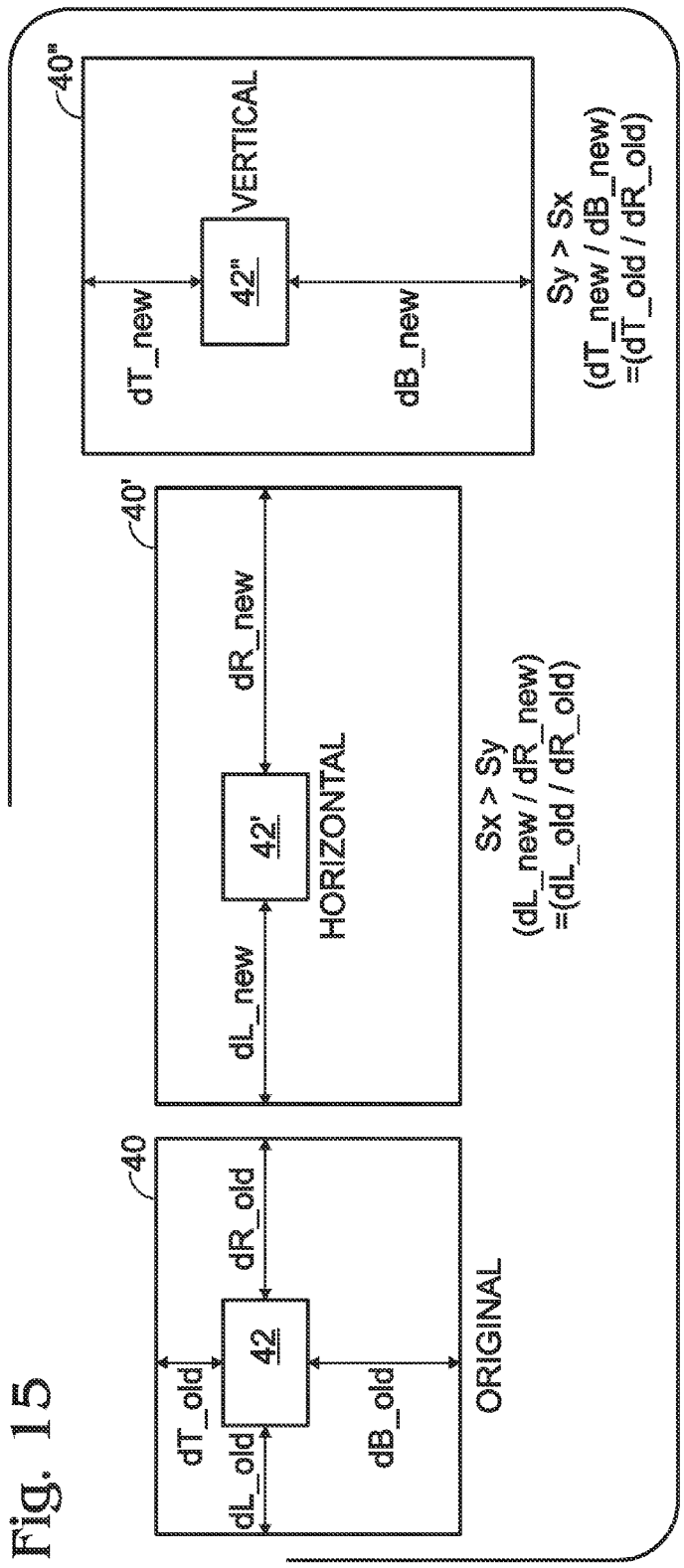
FIG. 15 depicts the calculations for scaling of foreground elements according to an embodiment of the present disclosure.

FIG. 15 depicts the calculations for determining how to position an element on a new page while maintaining the same relative spacing between an element and the edge of the page. As shown, original page 40 includes an element 42. For element 42, the distance from each edge of the element to each corresponding edge of the page can be calculated. For example, the distance from the right edge of the element to the right edge of the original page is dR_old, the distance from the left edge of the element to the left edge of the original page is dL_old, the distance from the top edge of the element to the top edge of the original page is dT_old, and the distance form the bottom edge of the element to the bottom edge of the original page is dB_old. Similarly, dL_new, dR_new, dt_new, and dB_new can be calculated. In order for an element to maintain the same relative horizontal spacing, dL_new/dR_new must be equal dL_old/dR_old. Similarly, in order for an element to maintain the same relative vertical spacing dT_new/dB_new must be equal to dT_orig./dB_orig.

Returning to FIG. 12, if the element is determined to be a vertical element, the method moves to block 514 to determine if the element is a left or right vertical element. The elements are then scaled maintaining the original aspect ratio and repositioned using the left (block 518) or right (block 522) side of the original image as a reference. Again, the aspect ratio of all the elements in the foreground layer may be preserved by selecting a uniform scaling factor along both the horizontal and vertical directions.

Figure 16:
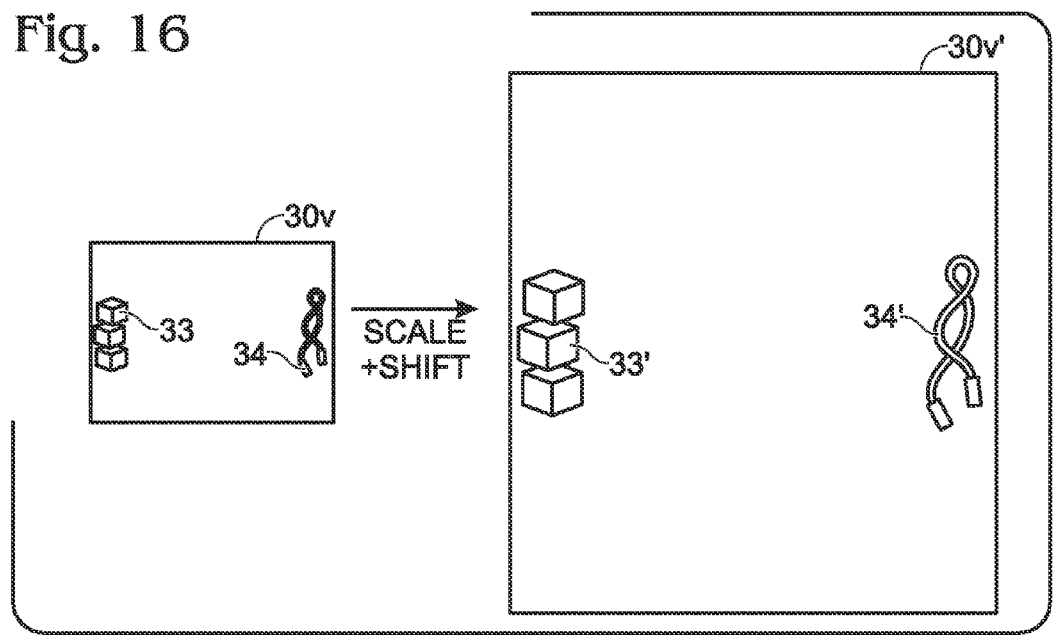
FIG. 16 depicts the scaling of vertical foreground elements according to an embodiment of the present disclosure.

For example, in FIG. 16, page 30$v'$ is twice as wide as page 30$v$, and three times the height. Accordingly, elements 33' and 34' are scaled by a factor of 2× (the minimum of the vertical and horizontal scaling factors) while maintaining the original aspect ratio. Moreover, elements 33' and 34' are repositioned so that they maintain the same relative vertical and horizontal spacing as elements 33 and 34.

Returning to FIG. 12, if the element is determined to be a corner element, the method moves to block 524 to determine if the element is a bottom-left, bottom-right, top-left, or top-right element. At 526, each element is then scaled, for example, by using the uniform scaling factor described above, while maintaining the original aspect ratio. At 528, the elements are then repositioned relative to the original corner while maintaining the same relative vertical and horizontal spacing as the original element.

Figure 17:
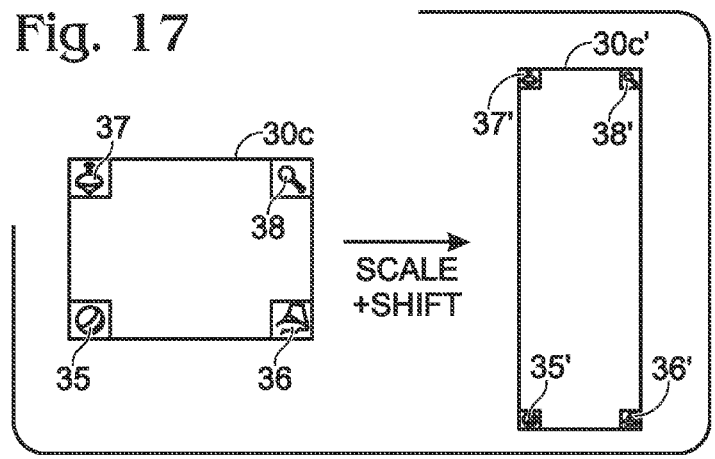
FIG. 17 depicts the scaling of corner foreground elements according to an embodiment of the present disclosure.

For example, in FIG. 17, page 30c' is half as wide and twice as tall as page 30c. Accordingly, each of corner elements 35', 36', 37', and 38' are scaled by a factor of ½ (the smaller of the vertical and horizontal scaling factors), while still maintaining the original aspect ratio. Moreover, each element is repositioned in its respective corner while maintaining the same relative vertical and horizontal spacing as elements 35, 36, 37, and 38, respectively.

According to another embodiment, the present disclosure provides image elements which can be combined, for example, with their original layer order to form a final image that can be used, for example, as a border for a photograph, newsletter, postcard, greeting card, or the like. According to one embodiment, each image element includes metadata associated with the element that indicates the element's position on the page in the final image and instructions related to how the image should be scaled to accommodate various page sizes. The instructions could take the form of simply an indication as to whether the image is a background or foreground image, or any other information such as that disclosed herein as being helpful for scaling.

Furthermore, individual image elements may or may not be stored together. For example, an art design for a final image may be composed of individual elements that are stored in various places—e.g., on the user's computer, on the internet, and/or on a disk. As such the art design could be expressed in an XML or other suitable format that describes the content and type of elements (top right corner, left vertical, etc.) The content for each element could be a file name or a URL address.

The disclosure may be further understood by reference to the Example provided below.

Example I

Automatically Resizing SnapFish Photo Borders

Digital borders for use with the Snapfish photosharing software were resized as described below. The code takes as input a set of PNG images that are rendered from the individual layers. The input layers and their attributes are specified by an input text file that looks like:

Background bk0 bk1
Foreground fg0 fg1

The text file states that bk0.png, bk1.png are the background layers and fg0.png, fg1.png are the foreground layers of the multilayer image. Each layer is processed separately using a set of rules to render a scaled version of that layer.

The application uses a hierarchy of classes to accomplish its goals. TransformEngine (TransformEngine.h) is at the top of the hierarchy and uses services provided by the other classes. It is also the main interface class. The main( ) function (SnapFish.cpp) instantiates an object named autoImageRescaler of type TransformEngine and calls all the public member functions of this class. The order of function calls roughly follows the order of the various steps of the scaling algorithm.

1. autoImageRescaler.LoadinputPNGImage( )
2. autoImageRescaler.BinarizeAlphaChannel( )
3. autoImageRescaler.LabelConnectedComponents( )
4. autoImageRescaler.WriteLabelsPNGImage( )
5. autoImageRescaler.ComputeElementProperties( )
6. autoImageRescaler.ClassifyElements( )
7. autoImageRescaler.ComputeElementTransformationMatrices( )
8. autoImageRescaler.TransformElements( )
9. autoImageRescaler.WriteOutputPNGImage( )

This set of calls writes scaled versions of the various layers to the disk. The scaled versions are named by appending "_scaled" to the filename. For example, the scaled version of bk0.png will be written into bk0_scaled.png. Similarly connected component labeling result with a bounding box around each connected region is written to a PNG file with suffix "_labeled" added to the original filename.

The above functions in turn use public member functions of other classes in the hierarchy. A listing of these other classes with a rough grouping based on the services provided by them is given below:

1. Element (TransformEngine.h)
2. ElemType (TransformEngine.h)
3. BkgdElemType (TransformEngine.h)
4. FrgdElemType (TransformEngine.h)

Compute and store attributes of the various elements (connected regions) output by the connected components algorithm.

5. Image (Image.h)
6. BinaryImage (BinaryImage)

These encapsulate data elements to hold image data and functions to do image manipulation. Image is a template class and BinaryImage is derived as a boolean version of the generic Image class. The connected component labeling algorithm is part of the BinaryImage class implemented as a LabelRegions( ) public member function.

7. PNGImage (PNGImage.h)

This is a wrapper class for the libpng (http://www.libpng.org) library and provides data elements and functions to hold and manipulate PNG images. It instantiates objects of type Image to handle the 4 different channels (R, G, B and Alpha) of the PNG image. Currently the interface to libpng is only for reading and writing PNG images through the wrapper functions LoadPNGFromFile( ) and WritePNGToFile( ).

8. Matrix (Matrix.h)
9. Vector (Vector.h)

These two classes facilitate matrix and vector operations.

In addition to the above classes, the code in the following files does the image scaling with bilinear interpolation when scaling up and low pass filtering followed by sub-sampling when scaling down.

Figure 18:
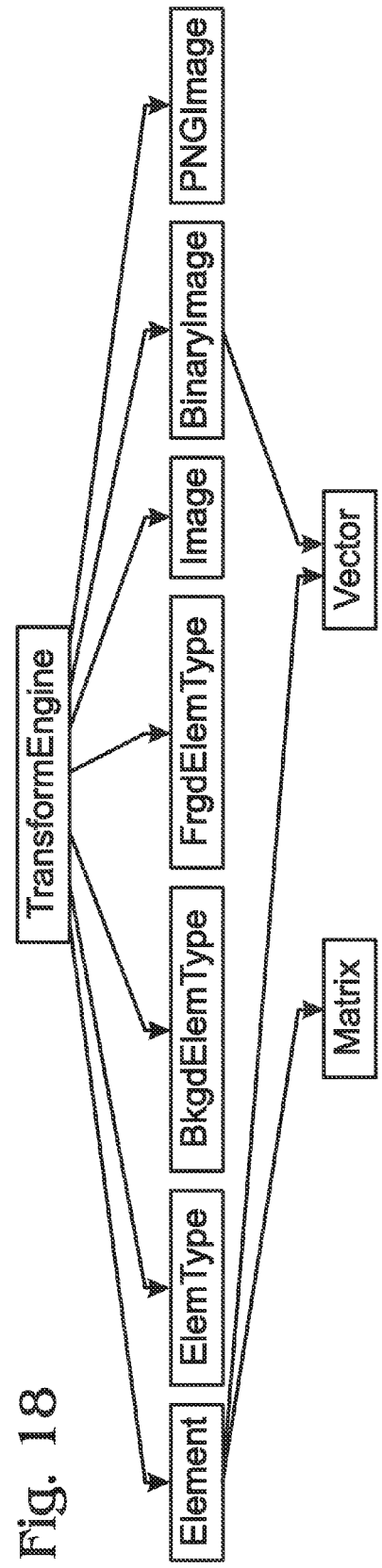
FIG. 18 depicts a representation of SnapFish class hierarchy.

10. scale.h and scale.cpp
11. scale16.h and scale16.cpp
12. ScaleImage.h and ScaleImage.cpp A rough representation of SnapFish class hierarchy is shown in FIG. 18. An arrow indicates that the class at the tail of the arrow is using the services of the class at the head of the arrow.

Classes and Methods

It should be noted that most of the functions in the application return an error code that is an integer value. It could be one of PG_ERROR or PG_NO_ERROR depending on whether the function has successfully completed its task. These error codes are defined in the stdafx.h file. In order to make error checking manageable without writing a lot of code a macro called ERE is also defined which can be used as ERE(function_name( )). This macro returns from the function where it is residing with the error code PG_ERROR if PG_ERROR is returned by the call to function_name( ). Otherwise it has no effect. The following is a brief description of the various classes and the most prominent member functions in the major classes.

1. TransformEngine

```
int LoadInputPNGImage(const char* fileName);
    Load input PNG image from the specified filename.
int BinarizeAlphaChannel(const BYTE& threshold);
    Binarize the alpha channel using the specified threshold.
int LabelConnectedComponents( );
    Label the connected components in the binary alpha channel.
int ComputeElementProperties( );
    Compute element properties.
int ClassifyElements(const int&    newPageNRows,
                     const int&    newPageNCols,
                     const BOOL&  frgdLayer = FALSE);
    Classify elements in order to compute appropriate element
    specific transformation matrix. The default assumption is that
    the elements belong to a background layer.
int ComputeElementTransformationMatrices( );
    Compute element specific transformation matrices.
int TransformElements( );
    Transform elements and write to output image.
int WriteLabelsPNGImage(const char* fileName);
    Write output labels PNG image to the specified filename.
int WriteOutputPNGImage(const char* fileName);
    Write output PNG image to the specified filename.
int InitializeOutputPNGImage(const BYTE& R = 0,
                             const BYTE& G = 0,
                             const BYTE& B = 0,
                             const BYTE& alpha = 0);
    Initialize output PNG image channels to the specified values.
    Default = 0 for all the channels.
int AddPNGFileToComposite(const char* fileName);
    Overlay the PNG image from input file on the composite image
    stored in m_PNG_outputPNGImage obeying the following rules:
        1. Ignore all pixels at which the alpha channel value is 0.
        2. Overwrite any previously stored RGB values at the pixels
           with alpha channel value not equal to 0.
int SplitHollowRectAreaElements( );
    Split hollow rectangular area elements into sub-elements.
int
ComputeSplitElementProperties(constVector<int>&topPeakIndexVector,
                              constVector<int>&bottomPeakIndexVector,
                              const Vector<int>& leftPeakIndexVector,
                              const Vector<int>& rightPeakIndexVector,
                              const Vector<long>& regionLabelsVector);
    Compute split element properties. The input is a set of 4
    vectors. Each of these vectors is used to specify the coordinates
    of the 4 corners for splitting the elements in the background
    layer.
int ClassifySplitElements( );
    Classify split elements in order to compute appropriate element
    specific transformation matrix.
int ComputeSplitElementTransformationMatrices( );
    Compute split element specific transformation matrices.
int PGLib::TransformEngine::TransformSplitElements( );
    Transform split elements and write to output image.
```

2. BinaryImage

```
int CountTruePixels( );
    Count number of (BOOL) 1 pixels.
long LabelConnectedComponents(Image<Long>& labeledImage);
    Connected component labeling.
long LabelRegions(Region         regions_list[],
                  Image<long>&   labeledImage,
                  long&          totalNumConnectedRegions,
                  const int&     neighborhoodSize       = 1,
                  const BOOL&   useFourConnectedness = FALSE,
                  const BOOL&   mergeRegionLabels     = FALSE);
```
Region coloring algorithm with the following features:
    1. Option of using four or eight connectedness.
    2. Variable neighborhood size for defining connectivity.

3. Image

```
Pixel<T>** GetBuffer( ) const;
    Access the pixel buffer assocaited with "this" image.
int NumRows( ) const;
    Access the number of rows of "this" image.
int NumCols( ) const;
    Access the number of columns of "this" image.
int CopyFromBuffer(const T* inputBuf,
                   const int& nRows,
                   const int& nCols);
    Copy the input buffer into "this" image.
int CopyToBuffer(T* targetBuf);
    Copy "this" image into a buffer (buffer must be previously
    allocated).
int CopyToByteImage(Image<BYTE>& targetByteImage,
                    const int& ROIStartRow,
                    const int& ROIStartCol,
                    const int& ROIHeight,
                    const int& ROIWidth,
                    const BYTE& bgVal = 0);
    Copy a region of interest (ROI) from "this" image into a byte
    image. The scaling of pixel values is determined by computing the
    maximum and minimum of the pixel values within the ROI. The
    region outside the ROI is filled with bgVal.
int AllocateImage(const int& nRows, const int& nCols);
    Generic allocation routine.
int DeAllocateImage( );
    Generic de-allocation routine.
int InitializeImage(const T& defaultValue);
    Generic initialization routine.
int CreateBinaryImage(const Image<BYTE>& inputImage,
                      const BYTE& threshold,
                      const BOOL& Invert = FALSE);
    Convert an input BYTE image into a binary Image by thresholding.
    Store the thresholded image into "this" image. By default (invert =
    FALSE), values below the threshold are set to 0, others are set
    to 1. If invert == TRUE, values below the threshold are set to 1,
    others are set to 0.
```

4. Matrix

```
int InitializeMatrix(const T& defaultValue);
    Generic initialization routine.
T& MatrixElement(const int& rowIndex, const int& colIndex) const;
    Access an element of "this" Matrix.
int CopyFromMatrix(const Matrix<T>& inputMatrix);
    Copy the contents of the inputMatrix into "this" Matrix.
int CreateIdentityMatrix(const int& size);
    Make "this" Matrix an identity matrix of the specified size.
int Create2DAffineMatrix(const T& xScale,
                         const T& yShear,
                         const T& xShear,
                         const T& yScale,
                         const T& xTranslate,
                         const T& yTranslate);
    Make "this" Matrix a 2D affine transformation matrix.
int MultiplyMatrixAndVector(Vector<T>& outputVector,
                            const Vector<T>& inputVector);
    Post-multiply "this" matrix with a column vector.
int MultiplyVectorAndMatrix(Vector<T>& outputVector,
                            const Vector<T>& inputVector);
    Pre-multiply "this" matrix with a row vector.
```

5. Vector

```
int NumElements( ) const;
    Access the number of elements of "this" Vector.
```

```
int AllocateVector(const int& nElements);
    Generic allocation routine.
int DeAllocateVector( );
    Generic deallocation routine.
int InitializeVector(const T& defaultValue);
    Generic initialization routine.
T& VectorElement(const int& elementIndex) const;
    Access an element of "this" Vector.
int CopyFromVector(const Vector<T>& inputVector);
    Copy the contents of the input Vector into "this" Vector.
double DotProduct(Vector<T>& inputVector);
    Dot product of "this" Vector with another.
int SortVectorElements(const int& startIndex = 0,
                const int& endIndex = m_i_NElements);
    Sort vector elements within an index range.
int WriteColVector(const char* fileName);
    Write vector as a column vector to an output file. If the output
    filename specifier string is NULL, then write to STDOUT.
int WriteRowVector(const char* fileName);
    Write vector as a row vector to an output file. If the output
    filename specifier string is NULL, then write to STDOUT.
int ComputeFirstOrdFwdDiff(Vector<T>& outputVector);
    Compute first order forward difference approximation to
    derivative, "this" Vector forms the input. The result is put into
    outputVector. It is allocated or resized to be the same size as
    "this" Vector. The first element of the outputVector is always set
    to 0 since the number of elements in the first order difference
    is always one less than in the input vector.
int Absolute(Vector<T>& outputVector);
    Compute the absolute values of "this" Vector elements. Store the
    result in outputVector. It is allocated or resized to be the same
    size as "this" Vector.
int Maximum(T& maxValue,
            int& maxIndex);
    Compute the maximum among all the elements of "this" Vector. The
    maximum value is returned in maxValue and its index is returned
    in maxIndex. In the case of repeated maximum values, the index of
    the first occurence in the Vector is returned.
int Minimum(T& minValue,
            int& minIndex);
    Compute the minimum among all the elements of "this" Vector. The
    minimum value is returned in minValue and its index is returned
    in minIndex. In the case of repeated minimum values, the index of
    the first occurence in the Vector is returned.
```

6. PNGImage

```
int NumRows( ) const;
    Access the number of rows of "this" image.
int NumCols( ) const;
    Access the number of columns of "this" image.
int AllocatePNGImage(const int& nRows, const int& nCols);
    Generic allocation routine.
int DeAllocatePNGImage( );
    Generic de-allocation routine.
Image<T>& GetRedChannelImage( );
    Access the red channel image.
Image<T>& GetGreenChannelImage( );
    Access the green channel image.
Image<T>& GetBlueChannelImage( );
    Access the blue channel image.
Image<T>& GetAlphaChannelImage( );
    Access the alpha channel image.
            int CopySubRowToRGBBuffer(T* targetBuf,
                    const int& rowIndex,
                    const int& startColIndex,
                    const int& endColIndex);
    Copy RGB data from a subrow of "this" PNG image into a RGB
    buffer.
int CopySubRowToAlphaBuffer(T*       targetBuf,
                    const int& rowIndex,
                    const int& startColIndex,
                    const int& endColIndex);
    Copy alpha channel data from a subrow of "this" PNG image into a
    buffer.
int CopySubRowToRGBBuffer(T* targetBuf,
                    const int& rowIndex,
                    const int& startColIndex,
                    const int& endColIndex,
                    const Region* regionsList,
                    const Image<long>& labelsImage,
                    const long& matchLabel,
                    const BOOL& serialLabels);
    Overloaded version of the generic CopySubRowToRGBBuffer( )
    function. Copies pixels whose labels in the labelsImage match the
    matchLabel value following the conventions below:
    If serialLabels is TRUE, pixels whose labels equal matchLabel are
    copied. If serialLabels is FALSE, pixels whose root label in the
    regionsList data structure equals matchLabel are copied.
int CopySubRowToAlphaBuffer(T* targetBuf,
                    const int& rowIndex,
                    const int& startColIndex,
                    const int& endColIndex,
                    const Region* regionsList,
                    const Image<long>& labelsImage,
                    const long& matchLabel,
                    const BOOL& serialLabels);
    Overloaded version of the generic
    CopySubRowToAlphaBuffer( )function.
    Copies pixels whose labels in the labelsImage match the
    matchLabel value following the conventions below:
    If serialLabels is TRUE, pixels whose labels equal matchLabel are
    copied. If serialLabels is FALSE, pixels whose root label in the
    regionsList data structure equals matchLabel are copied.
int CopyRGBBufferToSubRow(const T*    inputBuf,
                    const int& rowIndex,
                    const int& startColIndex,
                    const int& endColIndex,
                    const T&    alpha = 255);
    Copy data from a RGB buffer into a subrow of "this" PNG image.
    The alpha channel pixels are all set to the specified value
    (default = 255).
int CopyRGBBufferToSubRow(const T*       inputBuf,
                    Image<long>& labelsImage,
                    const int&     rowIndex,
                    const int&     startColIndex,
                    const int&     endColIndex,
                    const long&    regionLabel);
    Copy data from a RGB buffer into a subrow of "this" PNG image.
    The alpha channel pizels are ignored. Only those pixels in the
    subrow are considered that have not been previously assigned a
    RGB value. This is determined by checking for the existence of a
    non-zero label at the corresponding pixel location in the
    labelsImage.
    If RGB value is written at a pixel, then the corresponding
    pixel in the labelsImage is assigned the value of regionLabel.
int CopyAlphaBufferToSubRow(const T*    inputBuf,
                    const int& rowIndex,
                    const int& startColIndex,
                    const int& endColIndex);
    Copy data from an alpha channel buffer into a subrow of "this"
    PNG image.
int CopyNZAlphaBufferToSubRow(const T*    inputBuf,
                    const int& rowIndex,
                    const int& startColIndex,
                    const int& endColIndex);
    Copy data from an alpha channel buffer into a subrow of "this"
    PNG image. Only the non-zero values from the alpha buffer are
    copied.
int CreatePNGImage(const Image<T>& singleChannelImage,
            const T&       alpha              = 255,
            const BOOL&    scaleRange         = FALSE,
            const T&       maxScaledOutputValue = 255);
    Create a gray level PNG image from a single channel image.
    The alpha channel pixels are all set to the specified value
    (default = 255).
int LoadPNGFromFile(const char* fileName);
    Load PNG image from file.
int WritePNGToFile(const char* fileName);
    Write PNG image to file.
int DrawRegionProperties(const Region regionsList[],
                const long&  maxRegionLabel,
                const T&     boundingBoxR,
                const T&     boundingBoxG,
                const T&     boundingBoxB,
                const T&     centroidR,
```

-continued

```
            const T&     centroidG,
            const T&     centroidB);
```

Using information about labeled regions from a regionsList array, draw bounding box and center of mass location of each region.

While the invention has been described with reference to the exemplary embodiments thereof, those skilled in the art will be able to make various modifications to the described embodiments without departing form the true spirit and scope of the disclosure. Accordingly, the terms and descriptions used herein are set forth by way of illustration only and are not meant as limitations.

What is claimed is:

1. A method for auto-resizing an original digital image from an original image to a resized image, where the original image includes foreground elements and background elements, the method comprising:
    separating the foreground elements from the background elements;
    determining an original aspect ratio of the foreground elements;
    creating resized foreground elements by scaling the foreground elements while maintaining the original aspect ratio;
    creating resized background elements by stretching or shrinking the background elements to fit dimensions of the resized image; and
    repositioning the resized foreground and background elements on the resized image in order to maintain a design intention of the original image.

2. The method of claim 1 further comprising:
    extracting the foreground elements by binarizing the alpha channel or luminance of a foreground layer to create a binary image; and
    determining connected components in the binary image.

3. The method of claim 1 further comprising:
    extracting the background elements by binarizing the alpha channel of a background layer to create a binary image; and
    determining connected components in the binary image.

4. The method of claim 1 wherein the background elements are resized without regard to an original aspect ration of the background elements.

5. The method of claim 4 wherein elements having high symmetry, high size and low complexity are identified as background elements.

6. The method of claim 1 wherein creating resized foreground elements comprises:
    determining a horizontal scaling factor between the first size and the second size;
    determining a vertical scaling factor between the first size and the second size; and
    scaling the foreground element by the minimum of the horizontal and vertical scaling factors.

7. The method of claim 1 further comprising identifying a rectangular background element and separating the rectangular background element into horizontal and vertical elements.

8. A non-transitory computer readable medium having computer-executable instructions for auto-resizing an original digital image from an original image to a resized image, where the original image includes foreground elements and background elements, the instructions comprising:
    separating the foreground elements from the background elements;
    determining an original aspect ratio of the foreground elements;
    creating resized foreground elements by scaling the foreground elements while maintaining the original aspect ratio;
    creating resized background elements by stretching or shrinking the background elements to fit dimensions of the resized image; and
    repositioning the resized foreground and background elements on the resized image in order to maintain a design intention of the original image.

9. The computer readable medium of claim 8 further comprising instructions for:
    determining a horizontal scaling factor between the first size and the second size;
    determining a vertical scaling factor between the first size and the second size; and
    scaling the foreground element by the minimum of the horizontal and vertical scaling factors.

10. The computer readable medium of claim 8 wherein the original image is rectangular, the computer readable medium further comprising instructions for:
    determining whether each foreground element is a corner, horizontal, or vertical element.

11. The computer readable medium of claim 8 further comprising instructions for:
    measuring the symmetry, size, and complexity of each element in order to determine if each element is a foreground element or a background element.

12. The computer readable medium of claim 8 wherein the original image is rectangular and repositioning the resized foreground elements comprises, for each foreground element, determining whether the element is a corner, horizontal, or vertical element.

13. The computer readable medium of claim 8 where the foreground element is determined to be a corner element if any pair of adjacent element borders is within a given threshold distance from a pair of adjacent borders in the original image.

14. The computer readable medium of claim 13 further comprising instructions for classifying a corner element as a bottom-left, bottom-right, top left, or top right element.

15. The computer readable medium of claim 14 wherein repositioning the element comprises positioning the corner elements so that they are at a similar relative position with respect to the corners of the resized image as the original image by using the corresponding corner in the original image as a reference scaling axis.

16. The computer readable medium of claim 8 where the foreground element is determined to be a horizontal element if the element bounding box center lies closer to the left or right border of the original image than to the side borders of the original image.

17. The computer readable medium of claim 16 further comprising instructions for classifying a horizontal element as a top horizontal element if it lies closer to the top border of the original image than the bottom and as a bottom horizontal element if it lies closer to the bottom border of the original image than the top.

18. The computer readable medium of claim 8 where the foreground element is determined to be a vertical element if the element bounding box center lies closer to the left or right borders of the original image than the top or bottom borders.

19. The computer readable medium of claim 18 comprising instructions for classifying the vertical element as a left side element if it lies closer to the left border of the original image than the right border and as a right side element if it lies closer to the right border of the original image than the left border.

20. The computer readable medium of claim 8 wherein if an element is determined to be a horizontal or vertical element, repositioning the resized foreground element comprises shifting the element so that it occupies a similar relative position in the scaled image as it did in the original image.

\* \* \* \* \*

UNITED STATES PATENT AND TRADEMARK OFFICE
CERTIFICATE OF CORRECTION

PATENT NO. : 8,971,667 B2  Page 1 of 1
APPLICATION NO. : 11/551733
DATED : March 3, 2015
INVENTOR(S) : Hui Chao et al.

It is certified that error appears in the above-identified patent and that said Letters Patent is hereby corrected as shown below:

In the Claims

In column 17, line 47, in Claim 4, delete "ration" and insert -- ratio --, therefor.

Signed and Sealed this
Twenty-fifth Day of August, 2015

Michelle K. Lee
*Director of the United States Patent and Trademark Office*